United States Patent [19]

Miller

[11] Patent Number: 5,588,754
[45] Date of Patent: Dec. 31, 1996

[54] BACKUP BEARINGS FOR EXTREME SPEED TOUCH DOWN APPLICATIONS

[75] Inventor: Robin M. Miller, Ellington, Conn.

[73] Assignee: United Technologies Automotive, Inc., Dearborn, Mich.

[21] Appl. No.: 581,080

[22] Filed: Dec. 29, 1995

[51] Int. Cl.$^6$ .............................. F16C 19/10; F16C 32/04
[52] U.S. Cl. ..................... 384/609; 310/90.5; 384/102; 384/615; 74/572
[58] Field of Search ......................... 384/609, 102, 384/615, 617, 620; 310/90.5; 74/751, 572

[56] References Cited

U.S. PATENT DOCUMENTS

| | | | |
|---|---|---|---|
| 3,708,215 | 1/1973 | Wilcock et al. | |
| 3,841,173 | 10/1974 | Kraus | 74/751 |
| 4,480,881 | 11/1984 | Fujimori | 310/90 |
| 4,628,522 | 12/1986 | Ebersberger | 378/132 |
| 4,629,261 | 12/1986 | Eiermann et al. | 310/90.5 |
| 4,641,978 | 2/1987 | Kapich | 384/102 |
| 5,124,605 | 6/1992 | Bitterly et al. | 310/74 |
| 5,231,323 | 7/1993 | New | 310/90.5 |
| 5,321,329 | 6/1994 | Hovorka | 310/90.5 |
| 5,398,571 | 3/1995 | Lewis | 74/572 |
| 5,419,212 | 5/1995 | Smith | 310/90.5 |

OTHER PUBLICATIONS

"Fuel Cells and Flywheels", by G. Koprowski, Automotive Industries, Feb. 1995, pp. 136 and 138.
"UT and BMW Collaborate on Flywheel System", by Steven Ashley, Mechanical Engineering, Aug. 1994, p. 18.
"Will it fly? New Flywheel Technology Isn't Pie--In-The-Sky", by Karey McCann Ward's Auto World, Sep. 1994, p. 102.
"Automakers Move Toward New Generation Of 'Greener' Vehicles", by Deborah L. Illman, C&EN, Aug. 1, 1994, pp. 8–16.
"Flywheels Put A New Spin On Electric Vehicles", by Steven Ashley, Mechanical Engineering, Oct. 1993, pp. 44–51.

Primary Examiner—Lenard A. Footland
Attorney, Agent, or Firm—Jodi-Ann McLane

[57] ABSTRACT

A backup bearing for supplying backup to magnetic bearings is provided, the backup bearing comprising: an outer race disposed about the axis of a stationary shaft, the outer race mounted to a flywheel assembly for rotational movement about the axis; an inner race spaced from the outer race and disposed about the axis, the inner race being substantially stationary with respect to the axis; and a plurality of rolling elements each having a central axis with each element being spaced from the inner race and disposed between the inner and outer race for rotational movement therebetween. Rotation of the outer race causes corresponding rotation of the plurality of rolling elements such that upon contact of the rolling elements with the inner race, the speed differential between the rotating rolling elements and the substantially stationary inner race causes each rolling element contacting the inner race to accelerate about its central axis with little wear on the rolling elements due to skid damage because neither the inner race nor the outer race inertia needs to be overcome since both are always functioning at their operational speeds.

18 Claims, 2 Drawing Sheets

5,588,754

BACKUP BEARINGS FOR EXTREME SPEED TOUCH DOWN APPLICATIONS

BACKGROUND OF THE INVENTION

1. Technical Field

The present application relates to backup bearings and especially to backup bearings for extreme speed "touch-down" applications.

2. Background of Related Art

The flywheel, a balanced mass spinning around a constant axis that stores energy as rotational kinetic energy is one of humankind's earliest devices, serving as the basis for both the potter's wheel and the grindstone. Today, flywheel energy storage (FES) systems which store electric energy as kinetic energy and generate electric energy from the stored kinetic energy are being utilized for a number of applications. FES systems are currently being utilized in both mobile applications such as automotive and space applications, as well as stationary applications such as utility load-leveling systems, uninterrupted power supplies, and as storage capacity for solar and wind power systems. As is traditional, the term stationary refers to a system which is positioned primarily in a given geographic location as contrasted to a mobile system which is able to readily move between a variety of geographic locations.

FES systems generally include several principal components; namely a flywheel having a rotor and a hub, a motor/generator as well as magnetic bearings. Typically the system will also include a structural housing, a vacuum pump, electrical power input/output and electronic controls for the magnetic bearings.

It is known in the art to construct the flywheel rotor of high specific strength (i.e. strength/density) composite materials in order to optimize the flywheel's performance. The motor/generator is utilized to transfer electric power into the system to store it as kinetic energy when the system is acting as a motor and is also utilized to generate electric energy from the stored kinetic energy to transfer the electric energy out of the system when the system is operating as a generator. High-performance FES systems operate in a vacuum to minimize windage losses, aerodynamic heating and rotor instability. These high-performance systems therefore include a structural housing which also serves as a containment vessel to enclose any debris resulting from the failure of the rotor. Current FES systems also use magnetic bearings for supporting, or suspending the rotating flywheel within the housing.

Typically, the magnetic bearings utilized are either active or passive. In a typical active system the flywheel is suspended by magnetic forces created by the magnetic bearings. These forces, along with the loads that act on the flywheel, are controlled and balanced by proximity sensors and electronic feedback circuits working together to control the stability of the flywheel by introducing magnetic flux forces by controlling the currents in electromagnetic windings within the bearing assembly. Passive magnetic bearings, on the other hand, use powerful permanent magnets with specific geometries to support and stabilize the spinning flywheel without resorting to feedback control. Passive bearings help minimize parasitic losses while active bearings allow for more dynamic stability than passive bearings and are useful in mobile applications, such as in automobiles where compensation for road shocks and rotor balance to avoid flywheel instability is important.

Magnetic bearings work very well in situations of low energy loss and low vibration when they are properly placed, or centered, and operating. However, if the flywheel is forced off-center or if there is an interruption in the power source the bearings may not be able to restore themselves and can abruptly fail. In order to minimize damage within the system due to failure, many flywheels utilize rolling element backup bearings placed along the inner diameter of the flywheel such that if the flywheel becomes misaligned and is no longer operating on the magnetic bearings the backup bearings will take over in order to help prevent extensive damage to the entire system.

Typical rolling element backup bearings work well for spin-up under low energy situations for a short duration, but have limitations when there are repeated periods of high speed operation. "Spin-up" as used in this application refers to accelerating the stationary backup-bearing to operating speed by contact with a rotating element. Rolling element bearings typically include an inner race, rolling elements and an outer race all disposed about and stationary with respect to the stationary shaft of the FES system. The backup bearing assembly also includes an airgap located between the outer race and the rotating flywheel assembly. In a typical backup bearing system if the flywheel assembly becomes mis-aligned the flywheel assembly will impact the stationary outer race forcing the outer race to spin-up in speed with the load path going through the rolling element and the inner race. Impact of the rotating flywheel assembly with the outer race causes a skid area on the outer race, the skidding friction causing the outer race to begin rotating about the stationary shaft.

The energy transfer needed to "spin up" the rolling element in order to take over the operation of the flywheel assembly for the magnetic bearings is equal to the energy of accelerating the mass of the outer race plus the energy to accelerate the rolling elements to their operating speed. This energy is transmitted through the skidding of the outer race against the rotating flywheel assembly. The longer it takes the rolling element bearings to come up to speed the more skidding which occurs between the outer race and the flywheel assembly. In high speed applications the skid damage caused by the outer race contacting the rotating flywheel assembly results in shortened life of this contact surface in a typical backup bearing system.

A need therefore exists for a backup bearing which is capable of: 1) coming up to the operational speed of the flywheel assembly after magnetic bearing failure with little or no wear to the backup bearing device and 2) repeated periods of high speed operation after magnetic bearing failure with little wear to the backup bearing device.

The present application provides for a backup bearing system which is capable of quickly coming up to the operational speed of the flywheel assembly after magnetic bearing failure with little wear to the backup bearing and which is also able to operate for repeated "spin-up" periods at high speeds with little wear to the backup bearing system.

SUMMARY

A backup bearing for supplying backup to magnetic bearings is provided, the backup bearing comprising: an outer race disposed about the axis of a stationary shaft, the outer race mounted to a flywheel assembly for rotational movement about the axis; an inner race spaced from the outer race and disposed about the axis, the inner race being substantially stationary with respect to the axis; and a plurality of rolling elements each having a central axis with each element being spaced from the inner race and disposed between the inner and outer race for rotational movement therebetween. Rotation of the outer race causes corresponding rotation of the plurality of rolling elements such that upon contact of the rolling elements with the inner race, the speed differential between the rotating rolling elements and the substantially stationary inner race causes each rolling element contacting the inner race to accelerate about its central axis with little wear on the rolling elements due to skid damage because neither the inner race nor the outer race inertia needs to be overcome since both are always functioning at their operational speeds.

BRIEF DESCRIPTION OF THE DRAWINGS

Various embodiments are described herein with reference to the drawings, wherein.

The figures are meant to further illustrate the present application and not to limit the scope thereof.

DETAILED DESCRIPTION OF THE PREFERRED EMBODIMENTS

Figure 1:
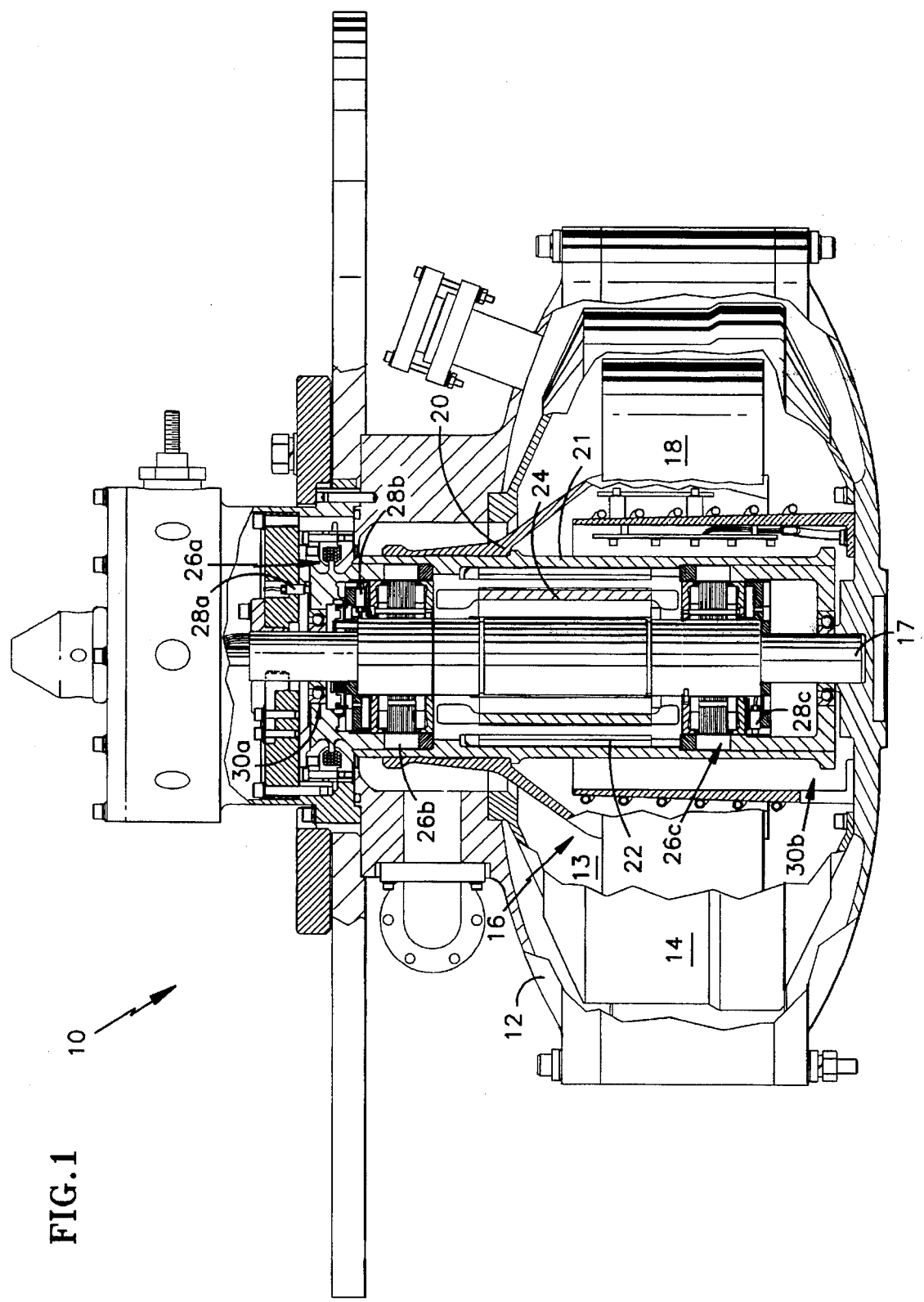
FIG. 1 is a cross-sectional view of a Flywheel Energy Storage (FES) system utilizing a backup bearing assembly according to the present application.

Referring now to FIG. 1 there is illustrated a cross-sectional view of one embodiment of a Flywheel Energy Storage (FES) system 10 according to the present application. System 10 consists of an outer vacuum housing 12, an inner containment ring 14, a rotating flywheel assembly 16, a stationary shaft 17, a motor/generator 24 and main bearings 26a,b,c. System 10 is preferably designed to store a total energy of 800 Watt-hours (Wh) at a maximum speed of approximately 35,000 Revolutions per minute (rpm). The usable energy storage at constant power is 600 Wh over an operating range from about 17,000 rpm to approximately 35,000 rpm. The rated power of the system is 25 kilowatts (kW) throughout the operating range, with approximately 50 kW available for several seconds at the maximum speed.

Housing 12 encloses vacuum chamber 13 in which the flywheel assembly 16 operates. Inner containment ring 14 helps contain any debris resulting from failure of the flywheel assembly 16, if failure should occur. Inner containment ring 14 which is located about flywheel assembly 16 is preferably made of a high tensile strength material, such as steel, in order to withstand the momentum of impact from any debris resulting from flywheel failure. Although the present embodiment utilizes a housing 12 in conjunction with a containment ring 14, a number of various containment systems may be utilized by one of skill in the art. The design of any containment system requires knowledge of: 1) the failure mode of the flywheel, 2) the kinematics of the failed pieces, and 3) response of the containment system. By evaluating each of these criteria one of skill in the art can design a suitable containment system for a particular FES system.

In the present embodiment the motor/generator 24 is a brushless permanent magnet motor which is water-cooled so as to maximize motor power density (watt/kg) and efficiency and to minimize energy dissipation in the flywheel assembly which operates in vacuum chamber 13. The motor/generator 24 spins the flywheel assembly 16 up to speed to transfer electric power into the system to store it as kinetic energy when the system is acting as a motor and also operates to generate electric energy from the stored kinetic energy to transfer the electric energy out of the system by coupling to the flywheel assembly when the system is operating as a generator, as is known in the art. In the present embodiment, motor/generator 24 is designed to be a 25 kw, 25% duty factor, 180V permanent magnet, 3 phase motor with 50 kw maximum input and output. Alternate motor/generators may be utilized depending upon the particular application for the FES system.

With continued reference to FIG. 1, flywheel assembly 16 consists of a composite rotor 18, a hub 20 and a cylinder 21 which contains back-iron 22 of the motor/generator 24 and the rotors of main bearings 26a,b,c. Although the present embodiment utilizes a composite rotor, other types of rotors including metallic rotors may also be utilized, especially for low energy, high power applications. A composite rotor is, however, preferred as optimal energy storage of a FES system can be accomplished by maximizing the ratio of energy to mass, termed the energy density, and the greatest energy density is found using the highest specific tensile strength flywheel material. Lightweight composite materials, consisting of fibers in a matrix, typically have very high material strengths relative to their mass densities. In addition, metallic rotors tend to shatter into sharp piercing fragments if failure occurs while composite rotors do not. Regardless of the material utilized, some factors which determine the design of the flywheel assembly include the desired energy storage capacity, cost, number of cycles and size constraints, etc. all of which are related to the application for which the FES system will be utilized. Flywheel assembly 16 is supported by main bearings 26a,b,c as it rotates about shaft 17.

In the present embodiment main bearings 26a, b, c are preferably active magnetic bearings and include an axial magnetic bearing 26a as well as a pair of radial magnetic bearings 26b, c. Active magnetic bearings are the preferred method of providing support to flywheel assembly 16 because they have low frictional losses, high speed capability, are compatible with a vacuum environment (i.e., do not require lubrication) and because they allow for active control of the flywheel assembly. The axial magnetic bearing 26a suspends the flywheel assembly 16 within containment housing 12 while the radial magnetic bearings 26b,c align the flywheel assembly 16 about shaft 17, as is known in the art. In the present embodiment the radial bearings 26b,c can each take a 150 lbs of load. Sensors 28a,b,c are connected through a path to each active bearing axis for each bearing 26a,b,c, for a total of five axis (radial bearings x and y axis, axial bearing z axis) for the three bearings. Sensors 28a,b,c are proximity sensors which provide electronic feedback in order to control the stability of the flywheel assembly by digitally controlling the bearing properties and operation in order to properly place the bearings and the flywheel relative to each other.

In the present embodiment magnetic bearings 26a, b, c are permanent magnet biased active bearings operating constantly at speeds over 1000 rpm although other magnetic bearings which would be known to those skilled in the art may be utilized depending upon the particular application.

Magnetic bearings 26a, b, c work well in most operating situations but do have load limits and may become unstable or even fail due to many reasons including, but not limited to, loss of power. There is therefore provided in the present application backup-bearing 30 which provides backup to magnetic bearings 26a, b, c in situations where the magnetic bearings 26a, b, c become unstable or fail.

Figure 2:
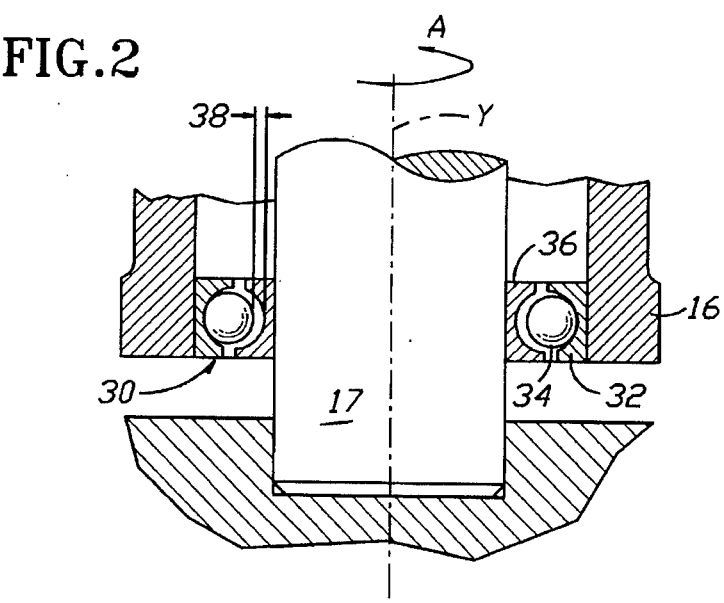
FIG. 2 is an enlarged view in partial cross-section of the backup bearing assembly of FIG. 1, spinning about axis Y, out of engagement with the flywheel assembly.
Figure 4:
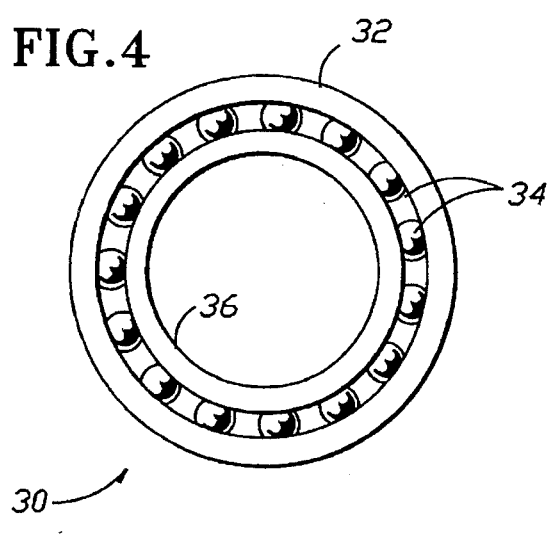
FIG. 4 is an enlarged top view of the backup bearing assembly of FIG. 1, illustrating the rolling elements.

Referring now to FIG. 2, there is illustrated an enlarged cross-sectional view of backup-bearing assembly 30, with stationary shaft 17, out of engagement with flywheel assembly 16. In the present embodiment backup bearing 30a is mounted at one end of shaft 17 and backup bearing 30b is mounted at an opposite end of shaft 17, as shown in FIG. 1. Since the operation of backup bearings 30a,b are the same, the bearings are collectively referred to herein as backup bearing assembly 30. Backup-bearing assembly 30 includes a rotating outer race 32 which is mounted to rotating flywheel assembly 16 by an interface fit, press fit, shrink fit, or other similar fitting, an inner race 36 constrained about stationary shaft 17 by preloading (not shown) along the shaft 17, and a plurality of rolling elements preferably 12 to 20 with 15 rolling elements being utilized in the present application as represented by rolling element 34 in FIG. 4. Rolling elements 34 are disposed between the outer race 32 and inner race 36 for rotational movement therebetween.

In the present embodiment inner race 36 is not in contact with rolling elements 34, but is spaced from the rolling elements at a predetermined distance such that there is an airgap clearance 38 disposed between the rolling elements 34 and the inner race 36. The inner race may be in contact with the rolling elements when stationary, but when the outer race begins to rotate, centrifugal forces would lift the rolling elements 34 off of the inner race 36 to the predetermined airgap clearance. Inner race 36 and outer race 32 are preferably constructed of a high temperature, hardened steel such as 52100 steel, but may be constructed of any material which would be cost effective while providing for rotational integrity and acceptable bearing life.

In the present embodiment backup bearings 30 are preferably a modified clearance, angular contact, outer diameter rotating, self-lubricating bearings which are 35 mm in diameter and include ceramic balls as the rolling element, although alternate sizes and materials such as steel may be utilized, as long as acceptable bearing life is achieved. Whatever types of bearings are utilized for backup, the bearings should have low friction losses, be capable of operating in a vacuum (i.e. are "dry" lubricated) and should also have very little temperature generation during operation. In addition, since the rolling element speed depends upon the bearing diameter and rpm, in order to minimize centrifugal loading on the rolling element the bearing diameter should be as small as possible for the given load application.

The operation of backup bearing 30 will now be described with reference to FIGS. 2–3. As shown in FIG. 2 during operation flywheel assembly 16 is rotating in the direction of arrow "A" about axis "Y" of stationary shaft 17. Outer race 32 and rolling element 34 are also rotating in the direction of arrow "A" at substantially the same speed as the flywheel assembly 16 since the rolling element is fitted into the outer race, the outer race being mounted to the rotating flywheel assembly 16. As the flywheel assembly 16, outer race 32 and rolling element 34 rotate in the direction of arrow "A", airgap clearance 38 is maintained between the rolling element 34 and the inner race 36 by the centrifugal forces. In the present embodiment airgap is approximately 0.002–0.005 inches in size. If flywheel assembly 16 experiences mechanical failure and moves off-center from shaft 17 thereby causing magnetic bearings 26a,b,c to become misaligned, or if the magnetic bearings are not properly aligned for any reason, including electric failure of the bearings, the flywheel assembly 16 will move the rolling element 34 into airgap 38 and into contact with inner race 36 as shown in FIG. 3.

Figure 3:
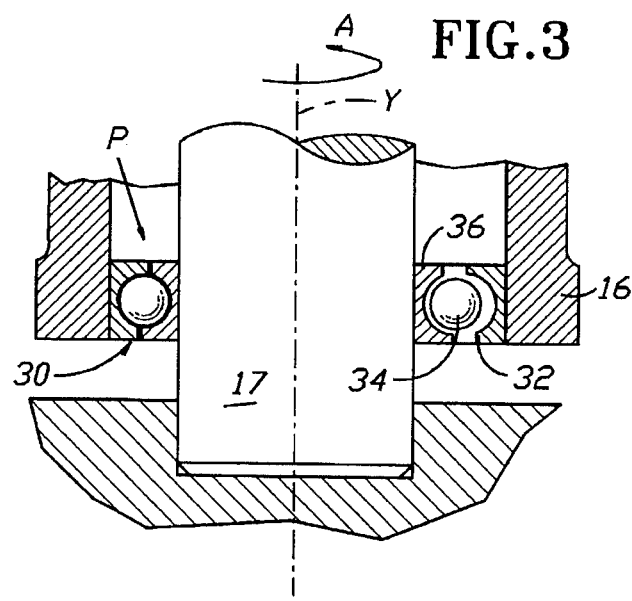
FIG. 3 is an enlarged view in partial cross-section of the backup bearing assembly of FIG. 1, spinning about axis Y, in engagement with the flywheel assembly.

Upon contacting inner race 36 the speed differential between the rolling element 34 which is rotating about axis "Y" and the inner race 36 which is stationary with respect to the "Y" axis will cause rolling element 34 to contact the inner race thereby causing the rolling element to accelerate about its own axis, illustrated in FIG. 3 as "p". Since the outer race and the rolling elements are rotating about the "Y" axis prior to contacting the inner race, the ratio of the outer race inertia to the rolling element inertia is very large, in the present application the ratio is more than approximately $1 \times 10^8$:1, therefore there is much less energy transfer necessary to accelerate the rolling elements to operating rotational speed, as opposed to the outer race. The mass moment of inertia of a sphere is calculated by using the formula: $2/5 \text{Mass}(\text{radius}^2)$, as is known in the art. Operating rotational speed is the speed at which the flywheel assembly's 16 rotation is maintained in both the axial and radial direction until such time as the magnetic bearings are once again operational. The rolling element should be as small as possible for the given application so as to lower the inertia of the rolling element itself and as stated above, are preferably made of ceramic because ceramic has a low density and low wear characteristics. In the present embodiment the rolling element is preferably a spherical shape rolling element with a diameter of approximately 3/16", although other shapes and sizes may be utilized, such as a pin roller, as long as frictional forces remain low and the particular operational requirements are met.

By rotating the rolling element 34 about the axis of the stationary shaft at substantially the same speed as the flywheel assembly 16, the rolling element quickly accelerates to operational rotating speed when contacting inner race 36 with little wear on the rolling element due to skid damage because neither the inner race nor the outer race inertia needs to be overcome since both the inner and outer race are already spinning at their operational, or final speeds. In addition, this embodiment allows for repeated high speed rotation of the rolling element with little wear because the rolling element 34 only engages the inner race when misalignment of the flywheel assembly occurs and is therefore not continually engaging the inner race.

It will be understood that various modifications may be made to the embodiments disclosed herein. For example, the magnetic bearings may instead be air bearings, and the backup bearing assembly may be used with other systems which utilize magnetic or air bearings, other than a flywheel energy storage system. In addition, although the stationary shaft of the present application is shown as being vertical, the shaft may alteratively be disposed horizontally or at an angle. Therefore, the above description should not be construed as limiting, but merely as exemplifications of preferred embodiments. Those skilled in the art will envision other modifications within the scope and spirit of the claims appended hereto.

I claim:

1. A backup bearing for providing backup to magnetic bearings comprising:

an outer race disposed about an axis, and mounted for rotational movement with respect thereto;

an inner race spaced from the outer race and disposed about the axis, the inner race being substantially stationary with respect to the axis;

a plurality of rolling elements each having a central axis with each element being spaced from the inner race and disposed between the inner and outer race for rotational movement therebetween;

wherein rotation of the outer race causes corresponding rotation of the plurality of rolling elements such that upon contact of the rolling elements with the inner race, the speed differential between the rotating rolling elements and the substantially stationary inner race causes each rolling element contacting the inner race to accelerate about its central axis.

2. The backup bearing of claim 1, wherein said bearing is mounted at one end to a stationary shaft.

3. The backup bearing of claim 2, wherein said inner race is constrained about said stationary shaft by preloading the shaft.

4. The backup bearing of claim 1, wherein said outer race is mounted to a rotating assembly.

5. The backup bearing of claim 1, wherein said plurality of rolling elements comprises about 12 to 20 rolling elements.

6. The backup bearing of claim 1, wherein said inner race and said outer race are constructed of a high temperature, hardened steel.

7. The backup bearing of claim 1, wherein said bearing has low friction losses.

8. The backup bearing of claim 1, wherein said bearing generates little temperature during operation.

9. A flywheel assembly used to store energy, said flywheel assembly comprising:

a) an outer housing enclosing a vacuum chamber;

b) a stationary shaft disposed within said outer housing;

c) a rotating flywheel assembly disposed about said stationary shaft;

d) a generator, said generator transfering electric power into the flywheel assembly when said flywheel assembly is acting as a motor, said generator also acting to generate electric energy from the stored kinetic energy in order to transfer the electric energy out of the flywheel assembly;

e) at least one main bearing disposed about said stationary shaft; and f) a pair of backup bearings, said backup bearings each being mounted at opposite ends of said stationary shaft and including:

i) an outer race mounted to the rotating flywheel assembly;

ii) an inner race constrained about said stationary shaft and substantially stationary with respect thereto;

iii) a plurality of rolling elements disposed between said outer race and said inner race, said rolling elements being spaced from said inner race, said space defining an air gap, said rolling elements also being fitted into said outer race such that rotational movement of said outer race about said stationary shaft causes corresponding rotational movement of said rolling elements about said stationary shaft.

10. The flywheel assembly of claim 9, wherein said plurality of rolling elements each include a central axis, such that upon contact of said rolling elements with said inner race, the speed differential between said rotating rolling elements and said substantially stationary inner race causes each of said rolling elements contacting said inner race to accelerate about its central axis.

11. The flywheel assembly of claim 9, wherein said at least one main bearing is a magnetic bearing.

12. The flywheel assembly of claim 11, wherein said magnetic bearing is an active magnetic bearing.

13. The flywheel assembly of claim 11, wherein said magnetic bearing is a passive magnetic bearing.

14. The flywheel assembly of claim 9, wherein said flywheel assembly is designed to store a total energy of approximately 800 Watt·hours.

15. The flywheel assembly of claim 9, wherein said inner race is constrained about said stationary shaft by preloading said shaft.

16. The flywheel assembly of claim 9, wherein said plurality of rolling elements comprises about 12 to 20 rolling elements.

17. The flywheel assembly of claim 9, wherein said airgap is approximately 0.002 to 0.005 inches wide.

18. The flywheel assembly of claim 10, wherein contact of said rolling element with said inner race causes minimal wear on said inner race.

* * * * *